United States Patent [19]

Lermuzeaux

[11] 4,090,669
[45] May 23, 1978

[54] PROCESS FOR EMBRITTLING INTEGUMENTS OF SMALL SEEDS

[75] Inventor: André Lermuzeaux, Sucy-en-Brie, France

[73] Assignee: L'Air Liquide, Societe Anonyme pour l'Etude et l'Exploitation des Procedes Georges Claude, Paris, France

[21] Appl. No.: 795,632

[22] Filed: May 10, 1977

[30] Foreign Application Priority Data

May 28, 1976 France .................. 76 16150

[51] Int. Cl.² ............................................. B02C 9/04
[52] U.S. Cl. ..................................... 241/8; 241/12; 241/DIG. 37; 241/65
[58] Field of Search ................... 241/7, 8, 9, 12, 65, 241/DIG. 37

[56] References Cited

U.S. PATENT DOCUMENTS

| 2,347,215 | 4/1944 | Pattee | 241/9 |
| 2,583,697 | 1/1952 | Hendry et al. | 241/8 |
| 3,314,802 | 4/1967 | Cohodas | 241/23 |
| 3,614,001 | 10/1971 | Beike | 241/DIG. 37 |
| 3,921,917 | 11/1975 | Meinass | 241/DIG. 37 |
| 3,965,267 | 6/1976 | Davis | 24/18 |

Primary Examiner—Granville Y. Custer, Jr.
Attorney, Agent, or Firm—Browdy and Neimark

[57] ABSTRACT

The present invention relates to the embrittlement of the integuments of small seeds wherein the seeds are cooled by thermal shock in a fluidized bed; cooling is provided by direct injection of a cryogenic fluid flash evaporated in the fluidized bed, forming the fluidization gas in the gaseous state, and recovery of cold by countercurrent circulation of the seeds. The process applies to small oleaginous seeds to facilitate their decortication, and to treatment of impermeable leguminous seeds to favor their eventual germination.

8 Claims, 1 Drawing Figure

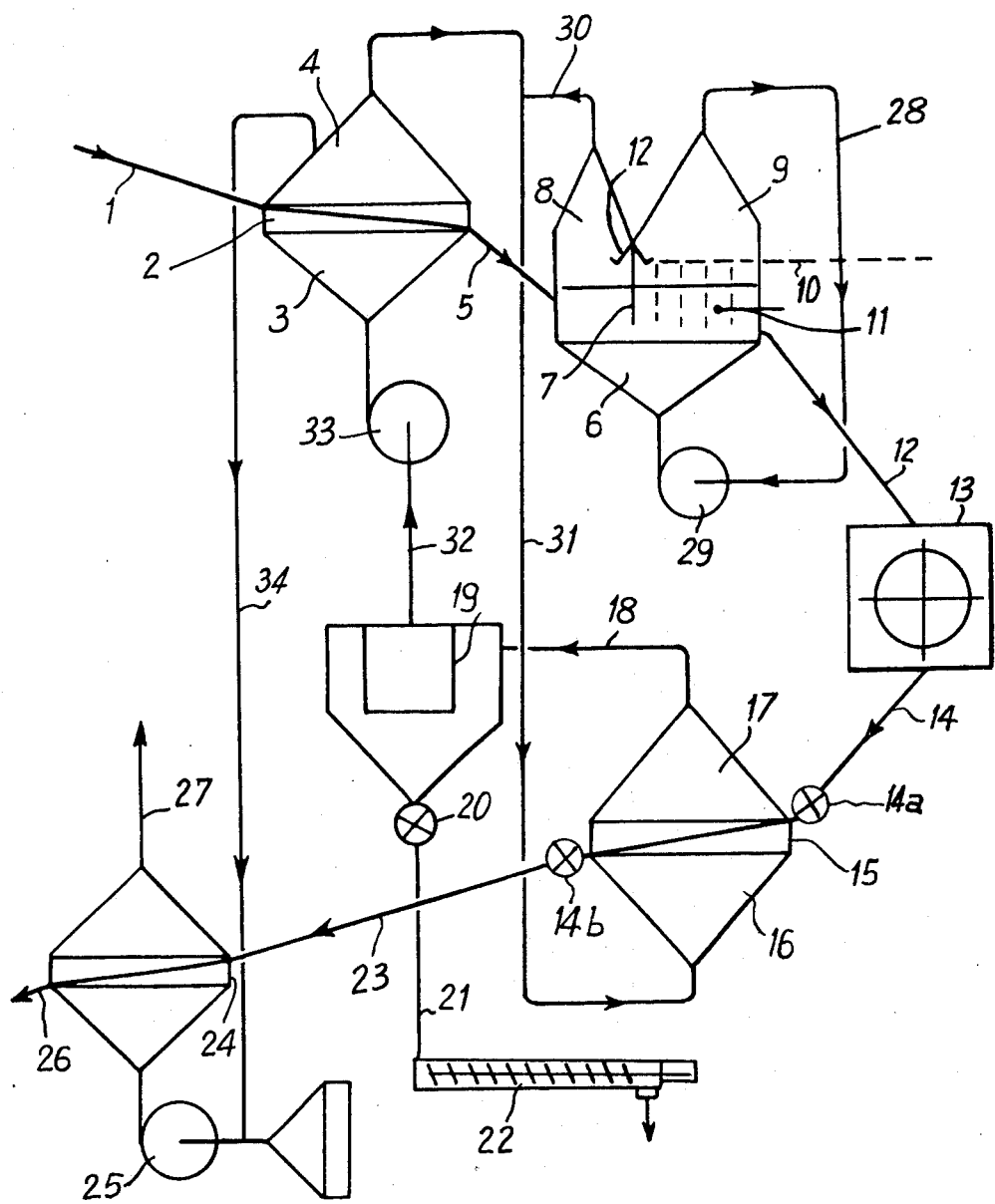

PROCESS FOR EMBRITTLING INTEGUMENTS OF SMALL SEEDS

FIELD OF THE INVENTION

The present invention relates to a process for embrittlement of the integuments of small seeds, such as small oleaginous seeds, to facilitate their decortication, and such as impermeable leguminous seeds to favor their eventual germination.

BACKGROUND OF THE INVENTION

According to the technique classically used in the oleaginous seed industry, small seeds are not decorticated and the oil in the kernel is extracted by pressing or by a solvent. The coat of the kernel is cumbersome and often unusable, and has an unfavorable effect on the extraction yield and grade of the end products and byproducts.

In the mustard industry, the seeds are crushed in mills with the verjuice in which the pulverized kernels are suspended. After crushing, the product obtained is filtered. The fine fraction constituting the mustard is separated while the coarse fraction containing the coats soaked with verjuice, and a not negligible part of the potentially usable raw material, is rejected as waste.

This process has several disadvantages. The discharge of waste carrying away a relatively substantial proportion of the oil causes a drop in yield by comparison with the volume of the seed's kernel. In addition, the screens used for filtering, although they are made of stainless and hence expensive steel, have a limited service life because they are attacked by the acid in the verjuice. In addition the waste product, containing the coat debris, causes blockages in the sewage system.

French Pat. No. 2,032,032 proposed a process consisting of freezing the seeds to solidify their fat content and provide the seed decortication operation at low temperatures such that the fats are solid during the entire operation. According to this process the mustard seeds are cooled to a temperature of about −25° to −35° C before decortication, the decortication chamber itself being held at a temperature of about −20° to −30° C.

In another technological area, it is known from D. Come and T. Tissaoui, "Revue generale du froid," No. 3, March 1973, that the mechanical effect of intense cold on the integuments of hard seeds, particularly leguminous seeds, has beneficial consequences since it permits better penetration of water when the seeds are allowed to germinate. D. Come considers that the impermeability of the integuments to water resides in the most superficial layer. It is thus likely that it is only needed to cool the surface down to a temperature of about −40° to −50° C to cause microcracking; controlled embrittlement of the coat must be rapid.

SUMMARY OF THE INVENTION

According to the invention, a process has been found permitting the seed integuments and coats to be embrittled at lower temperatures and greater speeds. This process may be built into a high-yield high-capacity industrial facility. In particular it enables heat transfer in the cooling area to be increased and the expenditure to be minimized and the cold to be recycled.

According to this small-seed integument embrittlement process, the seeds are cooled by thermal shock in a fluidized bed.

Cooling is ensured by direct injection of a cryogenic fluid which is flash-evaporated in a fluidized bed, constituting the fluidization gas in the gaseous state.

The cryogenic fluid is preferably liquid nitrogen or liquid carbon dioxide, flash evaporation of which avoids formation of solids as in the case of carbon dioxide.

The process enables seeds to be cooled in liquid nitrogen from +20° C down to −60° C at a rate of 5,000 kg/hr per m$^2$ of fluidized surface, the liquid nitrogen consumption being 2,000 liters/hr.

Most of the evaporated fluidization gas set in motion, and providing the cooling by thermal shock, circulates in a closed circuit, while the other part extracted from the cooling zone, at a temperature close to the temperature at which the seeds are introduced, provides for recovery of the cold by recirculation in the direction opposite to that of the seeds after treatment.

According to one advantageous embodiment, the seeds are precooled by countercurrent heat exchange with the gas stream which has recovered the cold.

According to another object of the invention this thermal shock cooling process can be integrated into a cryogenic seed decortication and cryocrushing process. This method of refrigeration has the advantage of thermal shock, favorable to decortication of small- and medium-sized seeds, for example less than 5–8 mm; for seeds of larger dimensions, the fluidization rates would be too large and the heat transfer would be limited by the specific surface of the product, which is too small.

The process according to the invention is particularly well adapted to decortication of oleaginous seeds such as mustard seeds.

In the decortication process the mustard seeds are treated in several sequences including:

a. precooling, consisting of reducing the mustard seed temperature from ambient temperature to about 0° C;

b. main cooling by thermal shock in a fluidized bed at a temperature between −40° and −60° C, ensured by direct injection of liquid nitrogen, flash evaporated in the fluidized bed and in the gaseous state constituting the fluidization gas; injection of the liquid nitrogen is regulated by the temperature of the fluidized bed and the majority of the fluidization nitrogen circulates in a closed loop;

c. decortication by cryogenic crushing at a temperature between −40° and −60° C;

d. reheating of the kernels, separation of the kernels from the integuments, and entrainment of the various waste products by circulation of the other part of the fluidization nitrogen extracted from the cooling zone at a temperature of about 0° C, with recovery of the cold by heat exchange, and countercurrent circulation of the nitrogen and the seeds;

e. reheating of the kernels in the vicinity of ambient temperature by a gas stream consisting of superheated air and dry nitrogen gas from the precooling zone; and f. separation of the waste through a filter and recycling of the dry gaseous nitrogen to the precooling zone, after filtration.

According to one characteristic of the decortication process, all the sequences are carried out in a dry inert nitrogen atmosphere, which avoids condensation problems.

The decortication and cryocrushing facility according to the invention comprises a cooler such as a thin-layer fluidization table which provides precooling of the seeds, which are then transported to the main liquid-nitrogen injection cooler where they undergo a thermal shock in a thick fluidized layer. The cooled seeds are decorticated in a crusher, which may be cooled by liquid-nitrogen injection in order to hold the seeds at a temperature of −40° to −60° C, since the crusher tends to elevate the temperature. The facility includes a second fluidization table in which seed reheating and recovery of some of the cold in the seeds are accomplished, followed by a filter provided with a hopper in which the various fine waste products, dust, and coat fragments are separated; these dusts are extracted by a lock or gate and heated by a screw for example. The facility also has a third fluidization table supplied with dry gaseous nitrogen and hot air in which final heating of the kernals takes place in the vicinity of ambient temperature.

The main liquid nitrogen injection cooler has two zones separated by a partition delimiting an inlet zone at a temperature close to the seed temperature and a cooling zone into which the liquid nitrogen is injected by a line fitted with a control or shut-off valve. The temperature of the fluidized bed is sensed with a probe and serves for regulation of liquid nitrogen injection. The fluidization gas is set in motion by a fan and recycled in a closed loop. The gas coming from evaporation is evacuated above the seed supply zone; a flap valve enables the quantities of gas to be balanced between recycling and extraction.

The injection of liquid nitrogen into the lower part of the bed is accomplished by any cryogenic fluid injection means through the intermediary of a pipe with a central feed pipe, several distributing units arranged in a line or in the form of a crown, or by an atomizing nozzle, for example.

The process and facility described are applicable with satisfactory results to all small oleaginous seeds in the manufacture of seed oil, in which crushing and coat elimination are improved. They are also valuable in the preparation of colza oil and all special-grade oils.

BRIEF DESCRIPTION OF THE DRAWING

The drawing is a flow sheet illustrating the process and apparatus.

DESCRIPTION OF PREFERRED EMBODIMENTS

An example illustrating the invention in a nonlimitative manner is given hereafter.

EXAMPLE

Process for decorticating mustard seeds for an output of 5000 kg/hr
Seed Circuit The seeds arrive at a temperature of about +20° C via pipe 1 at a first cooler 2 which provides precooling to about 0°. This precooler is of the flat thin-layer fluidization type and is composed of zones 3 and 4 at temperatures of −20° C in the lower zone and +10° C in the upper zone or collecting hood, respectively; the seeds leave it at a temperature of 0° C. They are then carried via conduit 5 to main liquid-nitrogen injection cooler 6 where they undergo a thermal shock in a fluidized layer about 250 mm thick which they leave at −60° C. The main cooler has two zones. The fluidized bed is separated by a partition 7 delimiting an inlet zone 8 at a temperature of about 0° C, or product introduction zone, and a cooling zone 9 into which the liquid nitrogen is injected via line 10 supplied with a control or shut-off valve, not shown. The temperature of the fluidized bed is sensed by probe 11 and is used to regulate injection of liquid nitrogen introduced at the average rate of 1,600 kg/hr. A valve 12 in separation partition 7 enables the quantities of gas to be balanced between recycling and extraction.

The cooled seeds exit via pipe 12 and are decorticated by a crusher 13 which may be cooled by liquid nitrogen injection, not shown, to keep the seed temperature between −50° and −60° C.

The seeds, fines, dusts, and coat and integument fragments leave the crusher via pipe 14, pass into a lock or gate 14a, and are introduced into a fluidization table 15 which has the purpose of heating them from −50° to −5° C and recycling some of the cold in the seeds. The lower zone of the fluidization table is at a temperature of 0° C and the upper zone at −22° C. This fluidization table is at a low pressure and the product enters and leaves via gates/locks 14a and 14b. The fines and coat fragments are entrained by the fluidization gas via pipe 18 and are separated by filter 19 which collects them into a hopper. These dusts and wastes are extracted by a lock or gate 20 and fed via 21 to a screw 22, for example, where they are heated.

After recovery of the cold, the seeds are raised from −5° C to the vicinity of ambient temperature to prevent condensation of atmospheric humidity, via pipe 23 to a fluidization table 24 supplied via 34 with gaseous nitrogen and hot air at 85° C, driven by fan 25. The seeds are extracted at 26 and the reheating mixture is exhausted at 27.

NITROGEN CIRCUIT

The nitrogen is injected in the liquid form at the rate of 1,600 kg/hr by spray head 10 at several injection points into the fluidized bed of main cooler 6 and circulates for the greatest flowrate in a closed loop 28 driven by fan 29.

The vaporized nitrogen escapes from the cooler at 30 with a mass flowrate corresponding to the injection flowrate in the liquid form; the temperature of the gaseous nitrogen leaving the main cooler via loop 30 is close to the temperature at which the seeds are introduced, namely 0° C. This gaseous nitrogen, with a mass flowrate of about 1600 kg/hr, passes into ventilation circuit 31 for the second fluidization table 15 and for the first fluidization table 2 via pipes 18 and 32. Fan 33 ensures that the nitrogen continues to circulate in the two fluidization tables. Fluidization table 15 is depressurized by this fan.

The gaseous nitrogen sucked through table 15 is filtered by filter 19, preferably a panel filter continuously declogged with jets of gaseous nitrogen. Fan 33 pressurizes fluidization table 2; collection hood 4 of this table is in communication with the atmosphere via the seed inlet. The nitrogen circuit is closed by fluidization table 15, but the nitrogen from main cooler 6 is in excess in this closed circuit, and is exhausted at collection hood 4 of table 2 via circuit 34; it is taken up and mixed with the heated air at the suction end of fan 25. The hot gases are then discharged into the atmosphere.

What is claimed is:

1. A process for embrittling the integuments of small seeds, comprising cooling the seeds by thermal shock in a fluidized bed; said cooling being by direct injection of a cryogenic fluid of liquid nitrogen or liquid carbon dioxide flash evaporated in a fluidized bed and constituting the fluidization gas in the gaseous state; setting in motion the major part of the fluidization gas to circulate in a closed circuit; and recovering cold by countercurrent circulation with the seeds of the other part of the fluidization gas removed from the cooling zone at a temperature close to the seed introduction temperature, to precool said seeds by countercurrent heat exchange.

2. A process according to claim 1, wherein impermeable leguminous seeds are treated with a view to favoring their eventual germination.

3. A process according to claim 1, wherein oleaginous seeds are treated with a view of facilitating their decortication.

4. A process in accordance with claim 1, wherein said precooling is carried out in a fluidized bed at a superatmospheric pressure.

5. A process for decorticating oleaginous seeds comprising subjecting the seeds to treatment in several steps including:
   a. precooling, consisting of lowering the seed temperature from ambient temperature to about 0° C;
   b. main cooling by thermal shock in a fluidized bed to a temperature between −40° and −60° C, provided by direct injection of liquid nitrogen flash evaporated in the fluidized bed, in the gaseous state, constituting the fluidization gas; injection of liquid nitrogen being regulated by the temperature of the fluidized bed; and the majority of the fluidization nitrogen being circulated in a closed circuit;
   c. decorticating the shock cooled seeds by cryogenic crushing at a temperature between −40° and −60° C;
   d. reheating the decorticated seed, separating the seed kernels and the integuments, and entraining the various waste products by circulation of the other part of the fluidization nitrogen extracted from the cooling zone at a temperature of about 0° C with recovery of cold by heat exchange, and countercurrent circulation of the nitrogen and the seeds;
   e. heating the kernels in the vicinity of ambient temperature by a gas stream composed of superheated air and dry gaseous nitrogen from said precooling;
   f. filtering the wastes and recycling after filtration of the dry gaseous nitrogen to said precooling; and
   g. maintaining in balance the quantities of gas from the main cooling zone for recycling and extraction.

6. A decortication process according to claim 5, wherein the various steps of the process are conducted in an inert dry nitrogen atmosphere.

7. A liquid-nitrogen injection cooler for embrittlement of the integuments of small seeds by cooling the seeds by thermal shock in a fluidized bed by direct injection of liquid nitrogen, comprising two zones separated by a partition delimiting an inlet zone at a temperature close to the seed temperature and a cooling zone, means for injecting liquid nitrogen into said cooling zone, a control valve for said liquid nitrogen injection, a fluidization bed temperature monitoring probe for controlling the amount of liquid nitrogen injected, a fluidization gas closed circuit recirculation fan, and a valve for balancing the quantities of recycled and extraction gas.

8. Apparatus for decorticating oleaginous seeds by cooling the seeds by thermal shock in a fluidized bed by direct injection of liquid nitrogen, comprising a first thin-layer fluidization table for precooling the seeds; a main liquid nitrogen injection cooler in which the seeds undergo a thermal shock in a thick layer; a crusher which may be cooled by liquid nitrogen injection; a second fluidization table in which the seeds are reheated to recover some of the cold remaining in the seeds; a filter in which the various waste products are separated; a third fluidization table supplied with dry gaseous nitrogen and hot air in which the kernals are finally heated.

* * * * *